(12) United States Patent
Oshita et al.

(10) Patent No.: US 8,151,668 B2
(45) Date of Patent: Apr. 10, 2012

(54) STEERING APPARATUS FOR VEHICLE

(75) Inventors: Morito Oshita, Kariya (JP); Masakazu Ozawa, Aichi-gun (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 965 days.

(21) Appl. No.: 12/213,453

(22) Filed: Jun. 19, 2008

(65) Prior Publication Data

US 2009/0000417 A1    Jan. 1, 2009

(30) Foreign Application Priority Data

Jun. 26, 2007    (JP) .................................. 2007-167402

(51) Int. Cl.
    B62D 1/18    (2006.01)
    B62D 1/16    (2006.01)

(52) U.S. Cl. .............................. 74/495; 74/493; 280/774

(58) Field of Classification Search ............ 74/493–495; 280/775

See application file for complete search history.

(56) References Cited

U.S. PATENT DOCUMENTS

| | | | | |
|---|---|---|---|---|
| 5,595,399 | A * | 1/1997 | Fouquet et al. ................. | 280/777 |
| 5,957,613 | A * | 9/1999 | Ruth ................................ | 403/48 |
| 6,079,743 | A * | 6/2000 | Grams ........................... | 280/775 |
| 6,637,771 | B2 | 10/2003 | Yoshimoto | |
| 7,159,904 | B2 * | 1/2007 | Schafer et al. ................. | 280/775 |
| 7,422,238 | B2 * | 9/2008 | Li et al. ........................... | 280/775 |
| 2005/0050979 | A1 * | 3/2005 | Barcat .............................. | 74/495 |
| 2005/0081675 | A1 | 4/2005 | Oshita et al. | |
| 2005/0127655 | A1 * | 6/2005 | Muramatsu et al. .......... | 280/774 |
| 2007/0295143 | A1 * | 12/2007 | Oh .................................. | 74/493 |

FOREIGN PATENT DOCUMENTS

| | | |
|---|---|---|
| DE | 43 44 681 A1 | 7/1994 |
| JP | 06-071888 B2 | 9/1994 |
| JP | 2002-193110 A | 7/2002 |
| JP | 2005-153849 A | 6/2005 |

OTHER PUBLICATIONS

Extended European Search Report issued Mar. 4, 2010 by the European Patent Office in corresponding EP 08 15 8851.9, EPO, Munich, DE.

* cited by examiner

*Primary Examiner* — Justin Krause
(74) *Attorney, Agent, or Firm* — Buchanan Ingersoll & Rooney PC

(57) ABSTRACT

A steering apparatus for a vehicle includes a movable column member supporting a steering wheel at a rear end of the movable column member and rotatably supported about a column swinging point provided at a front part of the movable column member relative to a vehicle body, a fixing bracket supported at an upper portion of the fixing bracket to the vehicle body and including first and second retaining portions that face each other and support the movable column member therebetween, first and second pressing mechanisms facing each other so as to press and support the movable column in a slidable manner, a first pivot axis disposed at a lower side of the fixing bracket, a second pivot axis disposed at a lower side of the movable column member, and a drive mechanism driven so as to adjust a distance between the first pivot axis and the second pivot axis.

18 Claims, 3 Drawing Sheets

STEERING APPARATUS FOR VEHICLE

CROSS REFERENCE TO RELATED APPLICATIONS

This application is based on and claims priority under 35 U.S.C. §119 to Japanese Patent Application 2007-167402, filed on Jun. 26, 2007, the entire contents of which is incorporated herein by reference.

FIELD OF THE INVENTION

The present invention relates to a steering apparatus for a vehicle. In particular, the present invention pertains to the steering apparatus for the vehicle supporting a steering column to be rotatable relative to a vehicle body and including a tilt adjusting mechanism that can adjust an operative position of a steering wheel.

BACKGROUND

A conventional steering apparatus for a vehicle includes a tilt adjusting mechanism that can adjust an operative position of a steering wheel. For example, a steering apparatus for a vehicle disclosed in JP2005153849A hereinafter referred to as Patent document 1 supports a steering column connected to a steering wheel at an end portion of the steering column. In the steering apparatus for the vehicle, the steering column is supported at a column supporting point relative to a vehicle body and rotates (swings) about a column swinging point located at an opposite of the steering wheel relative to the column supporting point, thereby moving the steering column vertically relative to the vehicle body. In particular, in the steering apparatus described in the Patent document 1, a distance between the column swinging point and the column supporting point is equal to or greater than 30% of a distance between the column swinging point and the steering wheel.

Further, an electric tilt adjustable steering apparatus for a vehicle disclosed in JP202193110A hereinafter referred to as Patent document 2 includes a tilt adjusting mechanism provided at one side of a steering column and a slide portion provided at the other side of the steering column. The tilt adjusting mechanism tilts and adjusts the steering column by converting a rotational driving force of an electric motor into a rectilinear motion. The slide portion slides the steering column that is in slidable contact with a stationary side by convex-concave fitting substantially in a triangular form upon tilt adjusting.

The steering apparatus disclosed in the Patent document 1 includes three links provided for preventing a concentration of a load to a limited position, thereby increasing rigidity of the steering column. However, many pivot points on the links for tilting the steering column are required, therefore increasing the number of components. Moreover, the steering apparatus disclosed in the Patent document 2 is configured so that the steering column is slid by the slide portion disposed at the other side of the steering column upon tilt adjusting. In such configuration of the steering apparatus, when the steering column is tilted vertically, a turning force, a so-called moment occurs because a point of application of force loaded upon tilting is not located vertically parallel to an axis of the steering column. Accordingly, it is difficult to secure a smooth tilting operation because of the moment.

A need thus exists for a steering apparatus for a vehicle, which is not susceptible to the drawback mentioned above.

SUMMARY OF THE INVENTION

According to an aspect of the present invention, a steering apparatus for a vehicle includes a movable column member supporting a steering wheel at a rear end of the movable column member and rotatably supported about a column swinging point provided at a front part of the movable column member to swing vertically relative to a vehicle body. The steering apparatus for the vehicle includes a fixing bracket including first and second retaining portions that face each other and extend in a downward direction of the vehicle. The movable column member is supported between the first and second retaining portions. The fixing bracket is supported at an upper portion of the fixing bracket to the vehicle body. The steering apparatus includes first and second pressing mechanisms facing each other so as to press and support the movable column in a slidable manner. The first pressing mechanism is disposed between the first retaining portion and the movable column member. The second pressing mechanism is disposed between the second retaining member and the movable column member. The steering apparatus includes a first pivot axis disposed at a lower side of the fixing bracket, a second pivot axis disposed at a lower side of the movable column member, and a drive mechanism driven so as to adjust a distance between the first pivot axis and the second pivot axis.

According to another aspect of the present invention, a steering apparatus for a vehicle includes a first column member supporting a steering wheel at a rear end of the first column member and a second column member disposed coaxially with the first column member and rotatably supported about a column swinging point provided at a front part of the second column member to swing vertically relative to a vehicle body. The steering apparatus for the vehicle includes a fixing bracket including first and second retaining portions that face each other and extend in a downward direction of the vehicle. The second column member is supported between the first and second retaining portions. The fixing bracket is supported at an upper portion of the fixing bracket to the vehicle body. The steering apparatus includes first and second pressing mechanisms facing each other so as to press and support the second column member in a slidable manner. The first pressing mechanism is disposed between the first retaining portion and the second column member. The second pressing mechanism is disposed between the second retaining member and the second column member. The steering apparatus includes a first pivot axis disposed at a lower side of the fixing bracket, a second pivot axis disposed at a lower side of the second column member, and a drive mechanism driven so as to adjust a distance between the first pivot axis and the second pivot axis.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
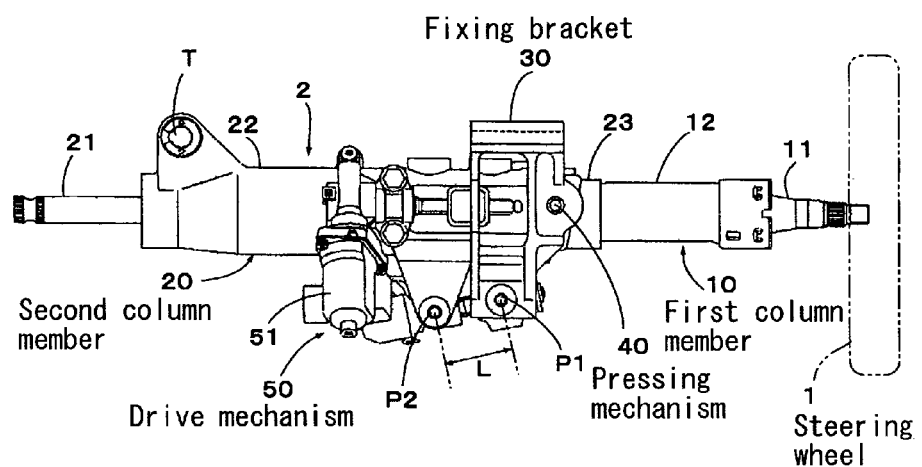
FIG. 1 illustrates a side view of a steering apparatus for a vehicle according to an embodiment of the present invention.

An embodiment of the present invention will be explained with reference to the illustrations of the drawing figures as follows. FIG. 1 illustrates an overall configuration of a steering apparatus for a vehicle according to the embodiment. A steering wheel support mechanism 2 for supporting a steering wheel 1 so as to adjust an operative position of the steering wheel 1 relative to a vehicle body (not shown) is provided at the steering apparatus for the vehicle. The steering wheel support mechanism 2 is connected mechanically and electrically to a steering mechanism (not shown) for transmitting a steering angle of the steering wheel 1 to wheels (not shown). The steering mechanism is configured to be driven in reaction to a rotary motion of the steering wheel 1 so as to turn angles of the wheels via a wheel steering mechanism (not shown). For example, when a steering apparatus for a vehicle is equipped with an electric power steering system (not shown), the steering wheel support mechanism 2 is connected mechanically to the electric power steering system. In the case of a steer-by-wire steering apparatus, the steering wheel support mechanism 2 is connected electrically to the steering mechanism.

According to the steering apparatus of the present embodiment, the steering wheel support mechanism 2 includes a first column member 10 (a first movable column member 10) supporting the steering wheel 1 at a rear end of the first column member 10 and a second column member 20 (a second movable column member 20) disposed coaxially with the first column member 10. A column swinging point (T) about which the second column member 20 swings vertically relative to a vehicle (not shown) is located at a front part of the second column member 20. The second column member 20 is rotatably supported about the column swinging point (T) in the steering wheel support mechanism 2. The second column member 20 is retained by a fixing bracket 30 to be fixed thereto. The first column member 10 includes an upper shaft 11 connected to the steering wheel 1 and an upper tube 12 disposed coaxially with the upper shaft 11 so as to accommodate the upper shaft 11. The upper shaft 11 is configured so as to move integrally with the upper tube 12 in an axial direction. Meanwhile, the second column member 20 includes a lower shaft 21 connected to the steering mechanism (not shown) and a lower tube 22 disposed coaxially with the lower shaft 21 so as to accommodate the lower shaft 21. The second column member 20 is configured so that the upper tube 12 is slidably accommodated within the lower tube 22 via an intermediate tube 23 in the axial direction. Accordingly, in the steering apparatus according to the embodiment, the upper shaft 11 is included in the first column member 10 and the lower shaft 21 is included in the second column member 20, thereby configuring a so-called steering column.

Figure 3:
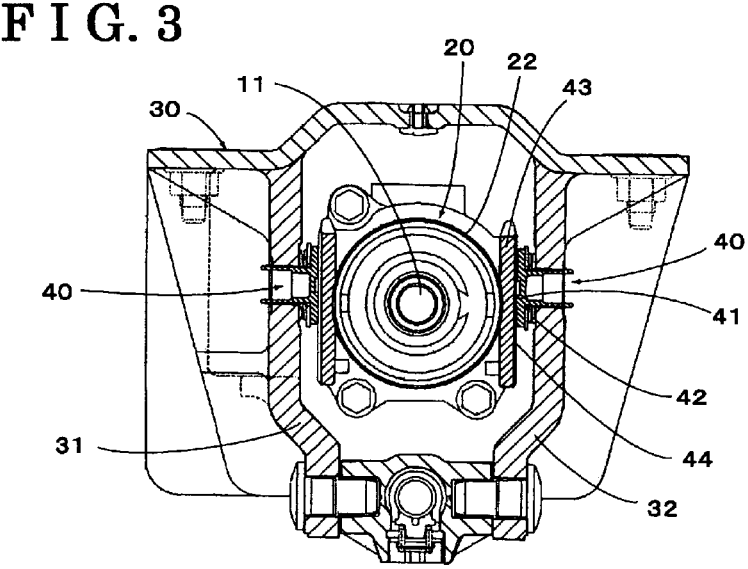
FIG. 3 illustrates a cross-sectional view of the steering apparatus according to the embodiment of the present invention.

As illustrated in FIG. 3, the fixing bracket 30 includes first and second retaining portions 31 and 32 facing each other, extending in a downward direction of the vehicle, and disposed at both right and left sides of the second column member 20 in a vehicle width direction. The second column member 20 (the lower tube 22) is retained between the first and second retaining portions 31 and 32. An upper portion of the fixing bracket 30 is fixed to the vehicle body. In addition, first and second pressing mechanisms 40, 40 are provided to face each other. The first pressing mechanism 40 is located between the first retaining portion 31 and the second column member 20 and the second pressing mechanism 40 is located between the second retaining portion 32 and the second column member 20. According to such configuration, the second column member 20 is pressed by the first and second pressing mechanisms 40, 40 so as to be slidably supported between the first and second retaining portions 31 and 32 of the fixing bracket 30.

As illustrated in FIG. 1, a first pivot axis (P1) is disposed at a lower side of the fixing bracket 30 so as to be substantially parallel to an axis of the second column member 20. Likewise, a second pivot axis (P2) is disposed at a lower side of the second column member 20 so as to be substantially parallel to the axis of the second column member 20. A drive mechanism 50 is disposed substantially parallel to the axis of the second column member 20. The drive mechanism 50 is driven so as to adjust a distance (L) defined between the first pivot axis (P1) and the second pivot axis (P2). In addition, an x-axis direction in figures other than FIG. 3 according to the embodiment indicates a longitudinal direction of the vehicle, a y-axis direction indicates a vertical direction of the vehicle, and a z-axis direction indicates a vehicle width direction. Accordingly, the first pivot axis (P1) and the second pivot axis (P2) are located in the z-axis direction in the figures other than FIG. 3 but located in the x-axis direction in FIG. 3.

Figure 2:
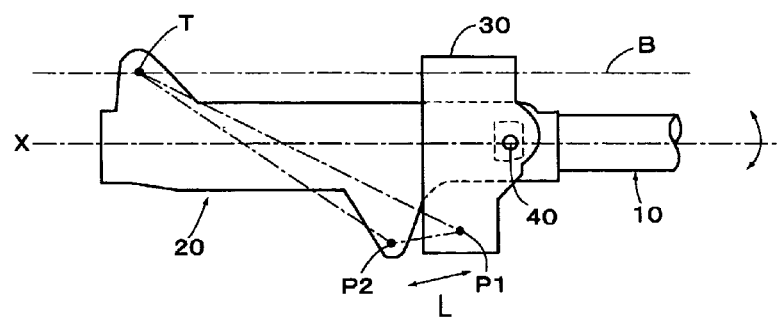
FIG. 2 illustrates a configuration diagram showing positional relations between main components of the steering apparatus for the vehicle according to the embodiment of the present invention.

Thus, the first column member 10, the second column member 20, the fixing bracket 30, the first and second pressing mechanisms 40, 40, and the column swinging point (T), the first pivot axis (P1), the second pivot axis (P2), and the vehicle body (indicated by a chain line "B" in FIG. 2) have positional relations shown in FIG. 2. The distance (L) between the first pivot axis (P1) and the second pivot axis (P2) is adjusted when the drive mechanism 50 is driven, thereby rotating the second column member 20 smoothly about the column swinging point (T). Accordingly, an inclination of the distance (L) is adjusted to a desired angle. In addition, the positional relations shown in FIG. 2 are illustrated only for easy explanation and actual dimensions are not indicated. Although a positional relation between the first and second pressing mechanisms 40, 40 is not illustrated in FIG. 2, the first and second pressing mechanisms 40, 40 are arranged at the both right and left sides of the second column member 20 in the vehicle width direction.

As illustrated in FIG. 3, the first and second pressing mechanisms 40, 40 are arranged at the both right and left sides of the second column member 20 in the vehicle width direction and configured so as to press the second column member 20 from the first and second retaining portions 31 and 32 toward an axial center of the second column member 20. The first and second pressing mechanisms 40, 40 include slide members 41, disc springs 42, and slide plates 43 respectively. The slide members 41 are fitted into the first and second retaining portions 31 and 32 respectively so as to be slidable relative to the second column member 20. The disc springs 42 are disposed respectively between one of the slide member 41 and the first retaining portion 31 and between the other one of the slide member 41 and the second retaining portion 32. The slide plates 43 are integrally formed with the second column member 20. In addition, the disc springs 42 serve each as a spring member so as to bias the slide members 41 to slide surfaces 44 of the slide plates 43 by biasing forces of the disc springs 42. Moreover, the slide members 41 contact the slide plates 43 integrally formed with the second column member 20, thereby functioning as a slide member which ensures smooth sliding of the second column member 20. Thus, the second column member 20 is pressed by the first and second pressing mechanisms 40, 40 in a slidable manner toward the axial center of the second column member 20. Accordingly, the second column member 20 is retained between the first and second retaining portions 31 and 32 of the fixing bracket 30 by means of equal pressing forces applied by the first and second pressing mechanisms 40, 40 from both right and left sides in the vehicle width direction toward the axial center of the second column 20. Consequently, rigidity (in the vertical direction of the vehicle) relative to rotation of the second column member 20 about the column swing point (T) is secured.

Figure 4:
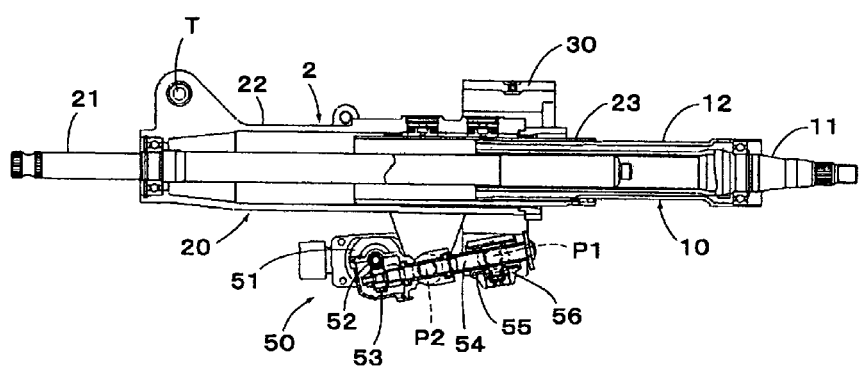
FIG. 4 illustrates a longitudinal sectional view of the steering apparatus according to the embodiment of the present invention.

The drive mechanism 50 is configured as illustrated in FIG. 4. The drive mechanism 50 includes an electric motor 51 supported to the lower side of the second column member 20 so as to be rotatable (swingable) about the second pivot axis (P2), a worm 52 disposed on an output shaft of the electric motor 51, a worm wheel 53 configuring a speed reducing mechanism by engaging with the worm 52, a screw shaft 54 having an external thread portion on the outer surface and connected to the worm wheel 53 so as to integrally rotate therewith, and a slider 56 within which an internal thread portion 55 is formed. The internal thread portion 55 of the slider 56 meshes with the external thread portion of the screw shaft 54, thereby engaging with the screw shaft 54. The slider 56 is supported by the fixing bracket 30 so as to be rotatably (swingably) about the first pivot axis (P1) disposed at the lower side of the fixing bracket 30. Hereby, a slider-crank mechanism is configured.

When the electric motor 51 is driven so as to rotate the screw shaft 54 about an axis of the screw shaft 54 at a speed lower than the rotational speed of the electric motor 51, the electric motor 51 moves forward and backward relative to the slider 56 while the internal thread portion 55 of the slider 56 meshes with the external thread portion of the screw shaft 54. Accordingly, the distance ("L" shown in FIG. 1) defined between the first pivot (P1) and the second pivot (P2) is shortened and enlarged. At the same time, the second column member 20 rotates about the column swing point (T) as well as the electric motor 51 rotates (swings) about the second pivot axis (P2). In addition, although the electric motor 51 is supported by the second column member 20 and the slider 56 is supported by the fixing bracket 30 in the steering apparatus according to the embodiment, the electric motor 51 may be supported by the fixing bracket 30 and the slider 56 may be supported by the second column member 20.

Figure 5:
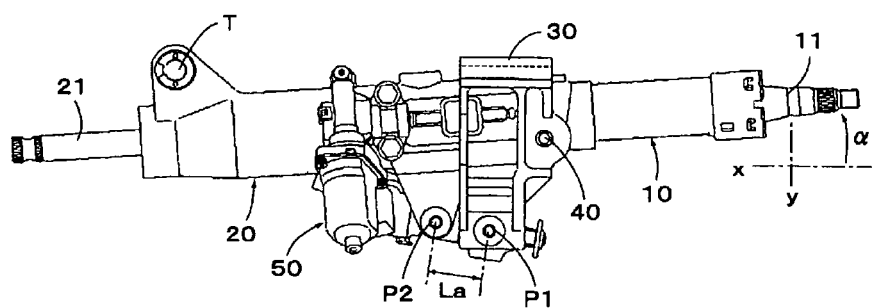
FIG. 5 illustrates an upwardly tilted condition of the steering apparatus according to the embodiment of the present invention.

A tilting operation according to the steering apparatus configured as above will be explained below. First, when the electric motor 51 is driven, the screw shaft 54 rotates along with the rotational movement (normal rotation) of the electric motor 51, thereby moving the electric motor 51 in a direction approaching to the first pivot axis (P1), for example as shown in FIG. 5. Accordingly, the distance (L) between the first pivot axis (P1) and the second pivot axis (P2) is shortened while the electric motor 51 is driven. Hereby, the first column member 10 and the second column member 20 rotate counterclockwise about the column swinging point (T). When the distance (L) between the first pivot axis (P1) and the second pivot axis (P2) is shortened to a distance (La), rear sides of the first column member 10 and the second column member 20 tilt upwardly (from a horizontal position) by an angle α. Accordingly, an operative position of the steering wheel 1 (shown in FIG. 1) is shifted to the highest position shown in FIG. 5.

Figure 6:
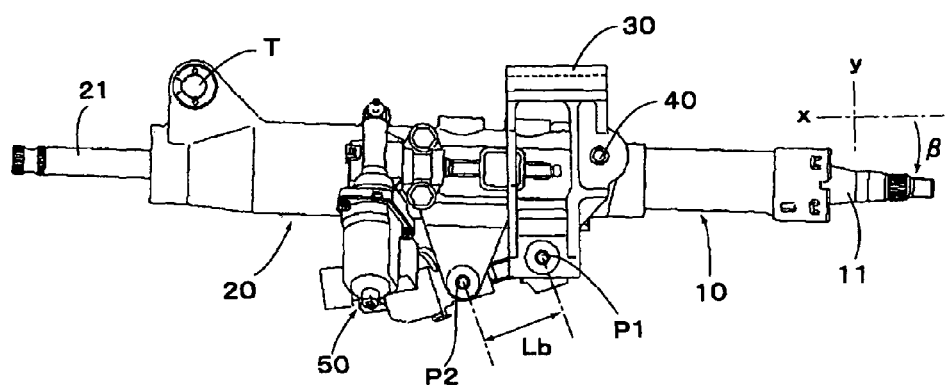
FIG. 6 illustrates a downwardly tilted condition of the steering apparatus according to the embodiment of the present invention.

On the contrary, when the electric motor 51 is driven to rotate in an opposite direction to the above-mentioned direction, the screw shaft 54 rotates along with the rotational movement of the electric motor 51, thereby rotating the electric motor 51 in a direction departing from the first pivot axis (P1). Accordingly, the distance (L) between the first pivot axis (P1) and the second pivot axis (P2) is enlarged while the electric motor 51 is driven. Hereby, the first column member 10 and the second column member 20 rotate clockwise about the swing center point (T). When the distance (L) between the first pivot axis (P1) and the second pivot axis (P2) is enlarged to a distance (Lb), the rear sides of the first column member 10 and the second column member 20 tilt downwardly by an angle β. Accordingly, the operative position of the steering wheel 1 is shifted to the lowest position shown in FIG. 6. In either condition in FIG. 5 or FIG. 6, while a tilting operation is controlled by the drive mechanism 50, the second column member 20 is retained by means of the pressing forces applied by the first and second pressing mechanisms 40, 40 from the both right and left sides in the vehicle width direction toward the axial center of the second column member 20. Accordingly, a reliable and smooth tilting operation is secured without generating a turning force (moment).

Figure 7:
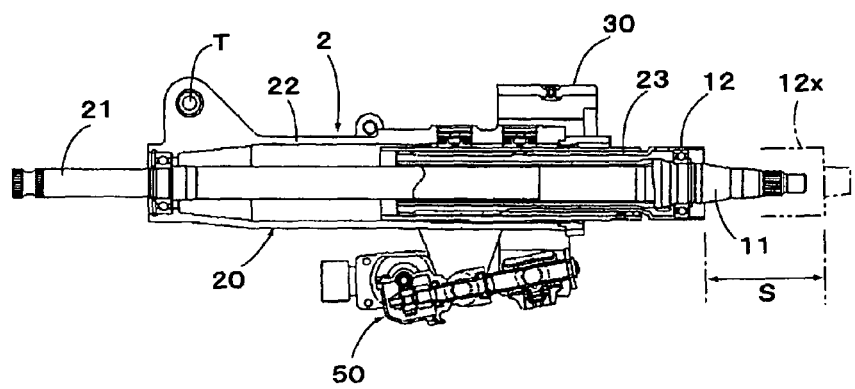
FIG. 7 illustrates a longitudinal sectional view of the steering apparatus according to the embodiment of the present invention in a condition where an impact is absorbed by the steering apparatus.

Furthermore, in the steering wheel support mechanism 2 of the steering apparatus according to the embodiment, the upper tube 12 and the intermediate tube 23 are moved integrally with each other relative to the lower tube 22 in the axial direction, thereby producing a so-called telescopic operation. Accordingly, the steering wheel 1 is axially adjusted to a desired position. The steering wheel support mechanism 2 of the steering apparatus according to the embodiment has an impact absorption function and operates as follows. For example, in a normal condition shown in FIG. 4, when a predetermined load or more is applied to the steering wheel 1 from rear to front (in the x-axis direction), the upper tube 12 is axially moved toward the intermediate tube 23. That is, as shown in FIG. 7, the upper tube 12 is moved forwardly by a distance (S) from a position (corresponding to a position 12X indicated by a chain double-dashed line in FIG. 7) of the normal condition to a position indicated by a full line shown in FIG. 7. Hereby, the steering wheel support mechanism 2 is shifted to a contracted condition as shown in FIG. 7. Consequently, an impact applied to the steering wheel 1 is absorbed during such a contracting motion of the steering wheel support mechanism 2 as mentioned above.

The impact absorption function is basically the same as the configuration of the steering apparatus described in the Patent document 1. When the predetermined load or more is applied to the steering wheel 1, the upper tube 12 is progressively accommodated into the intermediate tube 23. The impact due to the load is absorbed by the upper tube 12 being moved forwardly against frictional force of an annular frictional material (a corresponding number omitted) disposed between the upper tube 12 and the intermediate tube 23. Under this condition, there is no change in a positional relation between the first pivot axis (P1) and the second pivot axis (P2) while the telescopic operation is performed between the conditions of FIG. 4 and FIG. 7. Accordingly, in the steering apparatus including the impact absorption function as described in the embodiment, a tilt function is not deteriorated, and neither is the impact absorption function deteriorated because of a tilting operation.

When the steering apparatus requires neither the above-mentioned telescopic function nor the above-mentioned impact absorption function, a single movable column member (not shown) may be configured by the upper tube 12, the lower tube 22, and the intermediate tube 23 formed integrally with one another. In other words, a steering apparatus is configured as follows by applying the second column member 20 according to the embodiment as a movable column member. The steering apparatus includes the second column member 20 supporting the steering wheel 1 at a rear end of the second column member 20 and rotatably supported about the column swinging point (T) provided at a front part of the second column member 20 to swing vertically relative to the vehicle (not shown). At the same time, the steering apparatus is formed integrally with the upper shaft 11 and the lower shaft 21. Thus, the steering apparatus having a reliable and smooth tilt function may be provided even when having neither the telescopic function nor the impact absorption function.

As explained above, in the steering apparatus according to the embodiment, a tilt adjusting mechanism may be configured only by providing the column swinging point (T), the first pivot axis (P1), and the second pivot axis (P2). Accordingly, an inexpensive steering apparatus for a vehicle, which is composed of a smaller number of components and assembled to the vehicle more easily than a conventional steering apparatus, may be provided. In addition, the second column member 20 is pressed and supported by the first and second pressing mechanisms 40, 40 by means of the equal pressing forces applied from the both right and left sides in the vehicle width direction toward the axial center of the second column member 20. Consequently, an inexpensive tilt adjusting mechanism with high rigidity, which ensures a reliable and smooth tilting operation without generating a turning force (moment), may be configured.

According to the steering apparatus of the aforementioned embodiment, each of the first and second pressing mechanisms 40, 40 includes the slide member 41 sliding against the second column member and the disc spring 42 biasing the slide member 41 toward the second column member 20, and each of the first and second pressing mechanisms 40, 40 presses and supports the second member 20 in the slidable manner by means of the biasing force of the disc spring 42 from the both right and left sides in the vehicle width direction toward the axial center of the movable column member.

Accordingly, the reliable and smooth tilting operation may be performed by applying inexpensive components.

According to the aforementioned embodiment, the first pivot axis (P1), the second pivot axis (P2), and the drive mechanism 50 are disposed at the lower side of the second column member 20 and vertically parallel to the axis of the second column member 20 in the steering apparatus.

Thus, the second column member 20 may be pressed and supported at the lower side by the first and second pressing mechanisms 40, 40 by means of the equal pressing forces applied from the both sides in the vehicle direction toward the axial center of the movable column member. Accordingly, a compact steering apparatus having an inexpensive tilting mechanism with high rigidity may be provided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A steering apparatus for a vehicle, comprising:
a movable column member supporting a steering wheel at a rear end of the movable column member and rotatably supported about a column swinging point provided at a front part of the movable column member to swing vertically relative to a vehicle body;
a fixing bracket including first and second retaining portions that face each other and extend in a downward direction of the vehicle, the first and second retaining portions supporting the movable column member therebetween, the fixing bracket fixed at an upper portion of the fixing bracket to the vehicle body;
first and second pressing mechanisms facing each other so as to press and support the movable column member in a slidable manner, the first pressing mechanism disposed between the first retaining portion and the movable column member, the second pressing mechanism disposed between the second retaining portion and the movable column member;
a first pivot axis disposed at a lower side of the fixing bracket;
a second pivot axis disposed at a lower side of the movable column member;
a drive mechanism driven so as to adjust a distance between the first pivot axis and the second pivot axis; and
wherein the column swinging point is positioned forward of the fixing bracket so that the fixing bracket is positioned closer than the column swinging point to the steering wheel.

2. The steering apparatus for the vehicle according to claim 1, wherein each of the first and second pressing mechanisms includes a slide member sliding against the movable column member and a spring member biasing the slide member toward the movable column member, and each of the first and second pressing mechanisms presses and supports the movable column member in the slidable manner by means of a biasing force of the spring member from both sides in a vehicle width direction toward an axial center of the movable column member.

3. The steering apparatus for the vehicle according to claim 2, wherein the first pivot axis, the second pivot axis, and the drive mechanism are disposed at the lower side of the movable column member and vertically parallel to the axis of the movable column member.

4. The steering apparatus for the vehicle according to claim 1, wherein the first pivot axis, the second pivot axis, and the drive mechanism are disposed at the lower side of the movable column member and vertically parallel to an axis of the movable column member.

5. The steering apparatus for the vehicle according to claim 1, wherein the movable column member includes oppositely located first and second ends, the first end being positioned farther from the fixing bracket than the second end, and wherein the column swinging point is positioned at the first end of the movable column member.

6. The steering apparatus for the vehicle according to claim 1, wherein the first pressing mechanism and the second pressing mechanism are configured to permit vertical sliding movement of the movable column member relative to the first pressing mechanism and the second pressing mechanism when the movable column member moves vertically relative to the vehicle body.

7. The steering apparatus for the vehicle according to claim 1, the first pressing mechanism possessing a first slide member and the second pressing mechanism possessing a second slide member, wherein the first retaining portion is configured to restrain vertical movement of the first slide member and the second retaining portion is configured to restrain vertical movement of the second slide member when the movable column member moves vertically relative to the vehicle body.

8. The steering apparatus for the vehicle according to claim 1, the first pressing mechanism possessing a slide member and a spring member biasing the slide member into contact with the movable column member.

9. The steering apparatus for the vehicle according to claim 1, wherein the first pressing mechanism is configured to apply a biasing force toward the movable column member.

10. A steering apparatus for a vehicle, comprising:
a first column member supporting a steering wheel at a rear end of the first column member;
a second column member disposed coaxially with the first column member and rotatably supported about a column swinging point provided at a front part of the second column member to swing vertically relative to a vehicle body;
a fixing bracket including first and second retaining portions that face each other and extend in a downward direction of the vehicle, the first and second retaining portions supporting the second column member therebetween, the fixing bracket fixed at an upper portion of the fixing bracket to the vehicle body;
first and second pressing mechanisms facing each other so as to press and support the second column member in a slidable manner, the first pressing mechanism disposed between the first retaining portion and the second column member, the second pressing mechanism disposed between the second retaining portion and the second column member;
a first pivot axis disposed at a lower side of the fixing bracket;
a second pivot axis disposed at a lower side of the second column member;
a drive mechanism driven so as to adjust a distance between the first pivot axis and the second pivot axis; and
wherein the column swinging point is positioned forward of the fixing bracket so that the fixing bracket is positioned closer than the column swinging point to the steering wheel.

11. The steering apparatus for the vehicle according to claim 10, wherein each of the first and second pressing mechanisms includes a slide member sliding against the second column member and a spring member biasing the slide member toward the second column member, and each of the first and second pressing mechanisms presses and supports the second column member in the slidable manner by means of a biasing force of the spring member from both sides in a vehicle width direction toward an axial center of the second column member.

12. The steering apparatus for the vehicle according to claim 11, wherein the first pivot axis, the second pivot axis, and the drive mechanism are disposed at the lower side of the second column member and vertically parallel to the axis of the second column member.

13. The steering apparatus for the vehicle according to claim 10, wherein the first pivot axis, the second pivot axis, and the drive mechanism are disposed at the lower side of the second column member and vertically parallel to an axis of the second column member.

14. The steering apparatus for the vehicle according to claim 10, wherein the second column member includes oppositely located first and second ends, the first end being positioned farther from the fixing bracket than the second end, and wherein the column swinging point is positioned at the first end of the second column member.

15. The steering apparatus for the vehicle according to claim 10, wherein the first pressing mechanism and the second pressing mechanism are configured to permit vertical sliding movement of the second column member relative to the first pressing mechanism and the second pressing mechanism when the second column member moves vertically relative to the vehicle body.

16. The steering apparatus for the vehicle according to claim 10, the first pressing mechanism possessing a first slide member and the second pressing mechanism possessing a second slide member, wherein the first retaining portion is configured to restrain vertical movement of the first slide member and the second retaining portion is configured to restrain vertical movement of the second slide member when the second column member moves vertically relative to the vehicle body.

17. The steering apparatus for the vehicle according to claim 10, the first pressing mechanism possessing a slide member and a spring member biasing the slide member into contact with the second column member.

18. The steering apparatus for the vehicle according to claim 10, wherein the first pressing mechanism is configured to apply a biasing force toward the second column member.

* * * * *